United States Patent [19]
Nishino et al.

[11] Patent Number: 6,146,309
[45] Date of Patent: Nov. 14, 2000

[54] SYSTEM AND METHOD FOR PREVENTING OVERHEAT OF TORQUE CONVERTER

[75] Inventors: Kenji Nishino; Yuji Hayashi, both of Kanagawa, Japan

[73] Assignee: Nissan Motor Co., Ltd., Yokohama, Japan

[21] Appl. No.: 09/413,870

[22] Filed: Oct. 7, 1999

[30] Foreign Application Priority Data

Oct. 7, 1998 [JP] Japan .................................. 10-285151

[51] Int. Cl.⁷ ............................. F16H 59/72; F16H 61/14
[52] U.S. Cl. ................................ 477/98; 477/76; 477/61; 477/168
[58] Field of Search ................... 477/98, 168, 174, 477/76, 79, 61, 62

[56] References Cited

U.S. PATENT DOCUMENTS

| | | | |
|---|---|---|---|
| 4,733,581 | 3/1988 | Hasegawa et al. | 477/98 |
| 5,050,717 | 9/1991 | Shibayama | 477/98 X |
| 5,556,349 | 9/1996 | Ishii et al. | 477/76 |
| 5,609,552 | 3/1997 | Furuya et al. | 477/174 |
| 6,019,703 | 2/2000 | Black et al. | 477/168 |

FOREIGN PATENT DOCUMENTS

| | | |
|---|---|---|
| 2-180364 | 7/1990 | Japan . |
| 4-151069 | 5/1992 | Japan . |
| 8-42660 | 2/1996 | Japan . |
| 10-220573 | 8/1998 | Japan . |
| 11-315915 | 11/1999 | Japan . |

*Primary Examiner*—Charles A Marmor
*Assistant Examiner*—Ankur Parekh
*Attorney, Agent, or Firm*—Foley & Lardner

[57] ABSTRACT

A torque converter automatic transmission of a motor vehicle is equipped with an overheat prevention system of the torque converter. The system comprises a first unit which detects the temperature of a hydraulic fluid in an oil pan of the transmission; a second unit which detects whether the engine is under high load condition or low load condition; a third unit which derives an overheat judging reference temperature in accordance with the detection of the second unit, the overheat judging reference temperature indicating a first reference temperature upon detection of the high load condition of the engine by the second unit and indicating a second reference temperature upon detection of the low load condition of the engine by the second unit, the first reference temperature being lower than the second reference temperature; and a fourth unit which carries out a given operation to lower the temperature of the torque converter when the temperature of the hydraulic fluid in the oil pan exceeds the overheat judging reference temperature.

16 Claims, 6 Drawing Sheets

| FLAG<br>OVERHEAT JUDGING REFERENCE TEMPERATURE | 0<br>(LOW LOAD) | 1<br>(HIGH LOAD) |
|---|---|---|
| OVERHEAT OCCURRENCE DETERMINING REFERENCE TEMPERATURE | 120°C | 95°C |
| OVERHEAT SETTLEMENT DETERMINING REFERENCE TEMPERATURE | 115°C | 90°C |

SYSTEM AND METHOD FOR PREVENTING OVERHEAT OF TORQUE CONVERTER

BACKGROUND OF THE INVENTION

1. Field of the Invention

The present invention relates in general to a system and a method for protecting a torque converter of an automotive automatic transmission, and more particularly to a system and a method for preventing overheat of the torque converter.

2. Description of the Prior Art

In torque converter automatic transmissions of a motor vehicle, engine power is inputted through a torque converter to a transmission where the power is subjected to a path change (or gear change) for meeting each particular driving situation of the vehicle. One example of this type transmission is described in NISSAN CAR MANUAL tiled "Service Manual for RE4R01A type Automatic Transmission" issued from Nissan Motor Co., Ltd. in March 1987.

The torque converter and the transmission are operated under common usage of a hydraulic fluid. Since the torque conversion by the torque converter is carried out through the hydraulic fluid, the fluid tends to have a higher temperature. This tendency becomes marked as the load of the engine is increased, and thus when a higher load operation of the engine is continued for a longer time, the hydraulic fluid in the torque converter becomes to have a very high temperature.

In the torque converters of a lock-up type wherein input and outlet elements can be directly engaged through a lock-up clutch, such a high temperature of the hydraulic fluid tends to induce a premature deterioration of the facing material of the lock-up clutch and thus lower the durability of the automatic transmission.

In order to deal with such undesired phenomenon, various measures have been proposed and put into practical use. Almost all of them are of a type in which, as is described in the above-mentioned NISSAN CAR MANUAL and Laid-open Japanese Patent Application (Tokkai) 8-42660, when the temperature of the hydraulic fluid in the torque converter is detected or judged higher than a critical level, a certain operation is carried out to lower the heat generated by the torque converter.

SUMMARY OF THE INVENTION

It is therefore an object of the present invention to provide a system and a method for preventing overheat of the torque converter, which exhibit a satisfied performance as compared with conventional system and method.

It is another object of the present invention to provide a system and a method for preventing overheat of the torque converter, which assuredly suppress overheat of the torque converter with a reduced cost.

According to the present invention, there is provided, in a torque converter automatic transmission of a motor vehicle powered by an engine, an overheat prevention system of the torque converter. The system comprises a first unit which detects the temperature of a hydraulic fluid in an oil pan of the transmission; a second unit which derives an existing operation load of the engine; a third unit which derives an overheat judging reference temperature that lowers as the operation load of the engine increases; and a fourth unit which carries out an operation to suppress overheat of the torque converter when the temperature of the oil pan fluid temperature exceeds the overheat judging reference temperature.

According to the present invention, there is further provided, in a torque converter automatic transmission of a motor vehicle powered by an engine, an overheat prevention system of the torque converter. The system comprises a first unit which detects the temperature of a hydraulic fluid in an oil pan of the transmission; a second unit which detects whether the engine is under high load condition or low load condition; a third unit which derives an overheat judging reference temperature in accordance with the detection of the second unit, the overheat judging reference temperature indicating a first reference temperature upon detection of the high load condition of the engine by the second unit and indicating a second reference temperature upon detection of the low load condition of the engine by the second unit, the first reference temperature being lower than the second reference temperature; and a fourth unit which carries out a given operation to lower the temperature of the torque converter when the temperature of the hydraulic fluid in the oil pan exceeds the overheat judging reference temperature.

According the present invention, there is still further provided, in a torque converter automatic transmission of a motor vehicle powered by an engine, a method of suppressing overheat of the torque converter. The method comprises detecting the temperature of a hydraulic fluid in an oil pan of the transmission; detecting whether the engine is under high or low load condition; deriving an overheat judging reference temperature in accordance with the detection as to whether the engine is under high or low load condition, the overheat judging reference temperature indicating a first reference temperature upon detection of the high load condition and indicating a second reference temperature upon detection of the low load condition, the first reference temperature being lower than the second reference temperature; and carrying out a given operation to lower the temperature of the torque converter when the temperature of the hydraulic fluid in the oil pan exceeds the overheat judging reference temperature.

DETAILED DESCRIPTION OF THE INVENTION

Figure 1:
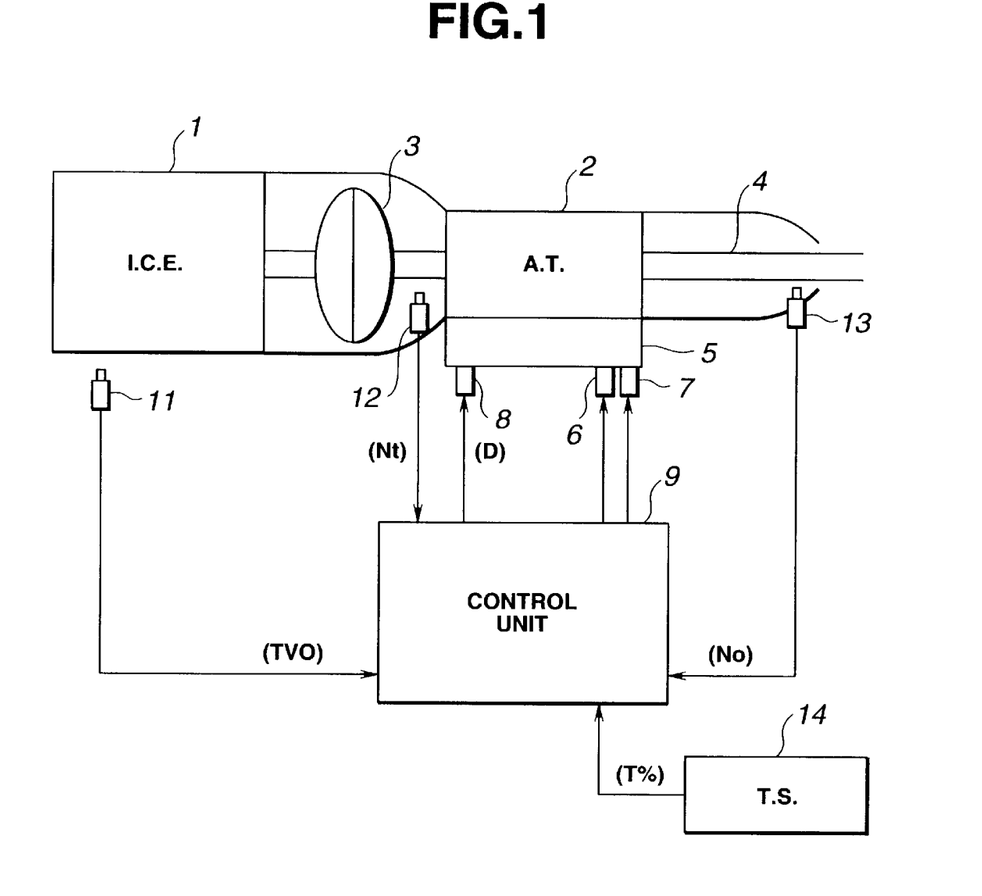
FIG. 1 is a schematic diagram of a torque converter overheat prevention system of the present invention, which is applied to an automotive automatic transmission.

Referring to FIG. 1, there is shown a schematic diagram of a torque converter overheat prevention system according to the present invention.

In the drawing, denoted by numeral 1 is an internal combustion engine for a motor vehicle and 2 is an automatic transmission powered by the engine 1 through a torque converter 3. That is, the power of the engine 1 is directed to the torque converter 3 for a torque conversion thereof and then directed to the transmission 2.

In the transmission 2, the torque-converted power is subjected to a path change in accordance with a selected gear before being directed to an output shaft 4. That is, due to ON/OFF conditions of shift solenoids 6 and 7 installed in a control valve 5, a desired gear is selected by the transmission 2.

In the torque converter 3, due to duty ratio control of a lock-up solenoid 8 in the control valve 5, a lock-up ON or OFF condition is selected. As is known, in the lock-up ON condition, input and output elements of the torque converter are directly engaged and thus the engine power is directly applied to the transmission 2, while in the lock-up OFF condition, the input and output elements are indirectly engaged through the hydraulic fluid and thus the engine power is subjected to a torque conversion before application to the transmission 2.

In the illustrated embodiment, when the drive duty ratio "D" is 5%, the lock-up solenoid 8 causes the torque converter 3 to establish the lock-up OFF condition, while, when the drive duty ratio "D" is 95%, the lock-up solenoid 8 causes the torque converter 3 to establish the lock-up ON condition.

The ON/OFF conditions of the shift solenoids 6 and 7 and the drive duty ratio "D" of the lock-up solenoid 8 are all controlled by a control unit 9. For this control, the control unit 9 inputs various information signals, which are a signal "TVO" from a throttle valve opening degree sensor 11 which detects the opening degree "TVO" of a throttle valve of the engine 1, a signal "Nt" from a turbine rotation speed sensor 12 which detects the rotation speed "Nt" of the input shaft of the transmission 2, a signal "No" from a transmission output shaft rotation speed sensor 13 which detects the rotation speed "No" of the output shaft of the transmission 2 and a signal "To/p" from an oil pan fluid temperature sensor 14 which detects the temperature "To/p" of the fluid in an oil pan of the transmission 2.

Based on these information signals "TVO", "Nt", "No" and "To/p" inputted thereto, the control unit 9 carries out a computing operation to accomplish the following control to both the transmission 2 and the torque converter 3, by actuating the shift solenoids 6 and 7 in ON/OFF manner and the lock-up solenoid 8 in a duty ratio manner.

Figure 7:
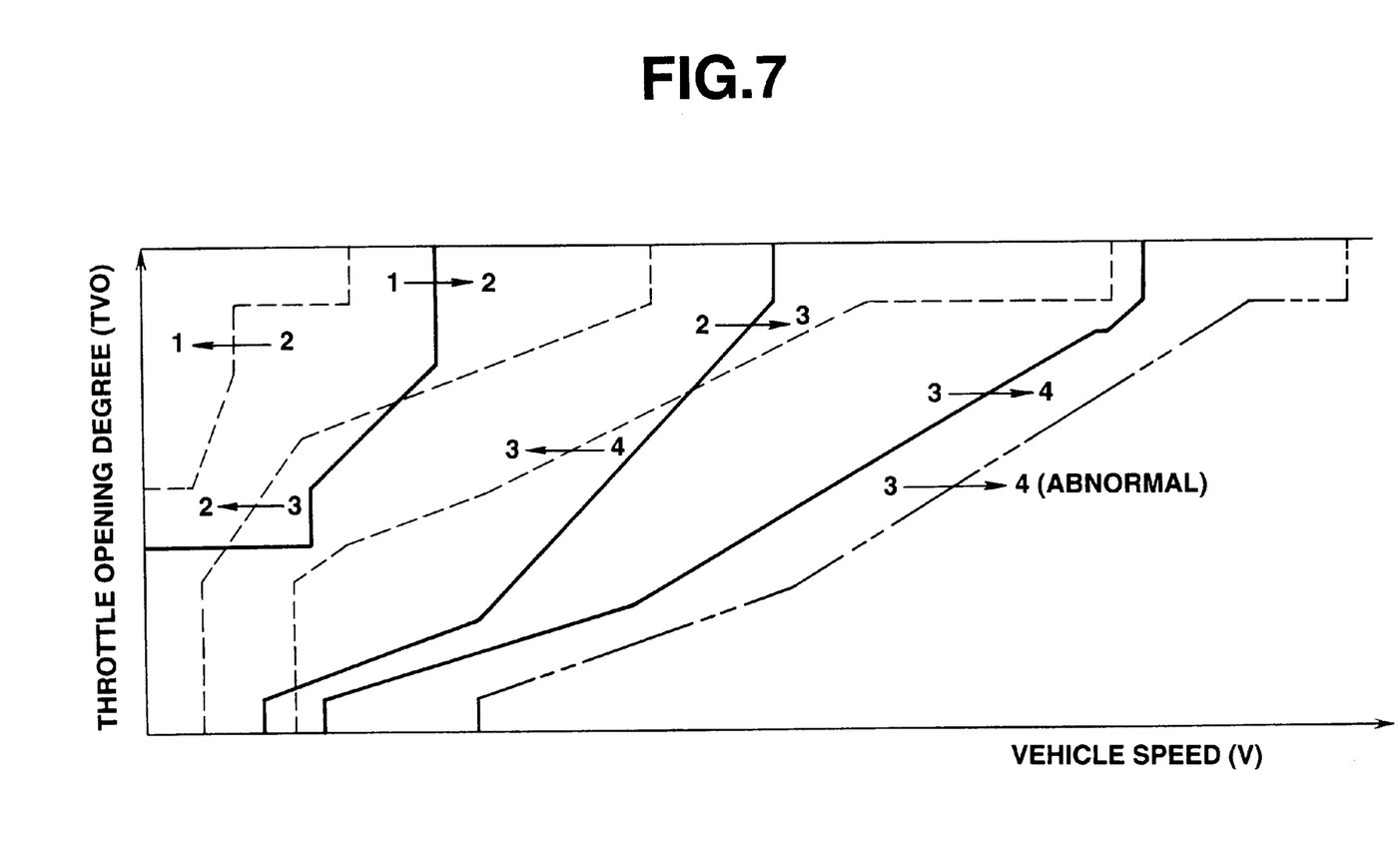
FIG. 7 is a shift pattern map of the automatic transmission, with an addition of an abnormal "3→4" up-shift pattern.

That is, in the control of the transmission 2, based on the throttle valve opening degree "TVO" and a vehicle speed "V" which is derived from the rotation speed "No" of the transmission output shaft 4, a gear suitable for the existing driving situation of the vehicle is looked up from the shift pattern map of FIG. 7.

In the map of FIG. 7, the solid lines represent a normal "1→2" up-shift pattern, a normal "2→3" up-shift pattern and a normal "3→4" up-shift pattern and the broken lines represent a normal "4→3" down-shift pattern, a normal "3→2" down-shift pattern and a normal "2→1" down-shift pattern which are all to be used when the torque converter 3 is not overheated.

While, in the shift pattern map of FIG. 7, the two dot line represents an abnormal "3→4" up-shift pattern which is to be used when the torque converter 3 is overheated.

It is to be noted that in the map of FIG. 7, in addition to the above-mentioned abnormal "3→4" up-shift pattern, corresponding abnormal shift patterns are to be provided for the other normal up-shift patterns and normal down-shift patterns. However, for clarification of the map of FIG. 7, illustration of such abnormal shift patterns is omitted from the drawing.

In all cases, as is understood from the abnormal "3→4" up-shift pattern, any abnormal shift pattern is positioned at a higher vehicle speed side than the corresponding normal shift pattern.

It is to be noted that when selecting the abnormal shift pattern, the transmission 2 can easily assume a lower gear as compared with a case of selecting the corresponding normal shift pattern.

As will be described in detail hereinafter, for judging the overheat condition of the torque converter 3, there is provided an overheat judging reference temperature for each of engine high and low load operation conditions. Each overheat judging reference temperature has a range of 5° C., whose upper and lower values are an overheat occurrence determining reference temperature and an overheat settlement determining reference temperature, respectively. The overheat occurrence determining reference temperature is higher than the overheat settlement determining reference temperature by 5° C.

During operation of the engine 1, the temperature "To/p" of the fluid in the transmission oil pan is compared with the overheat judging reference temperature, and if the oil pan fluid temperature "To/p" is detected higher than the overheat occurrence determining reference temperature, judgment is so made that the torque converter 3 is overheated, and if the oil pan fluid temperature "To/p" is detected lower than the overheat settlement determining reference temperature, judgement is so made that the torque converter 3 is not overheated.

Based on the judgements, the control unit 9 determines a suitable gear for the transmission 2. That is, when overheat of the torque converter 3 is not detected, the control unit 9 determines the suitable gear with reference to the normal up-shift and down-shift patterns of FIG. 7. While, when overheat of the torque converter 3 is detected, the control unit 9 determines the suitable gear with reference to the abnormal up-shift and down-shift patterns which are exemplarily represented by the abnormal "3→4" up-shift pattern of FIG. 7.

In order to allow the transmission 2 to assume the abovementioned suitable gear, the control unit 9 actuates the shift solenoids 6 and 7 in ON/OFF manner.

Figure 8:
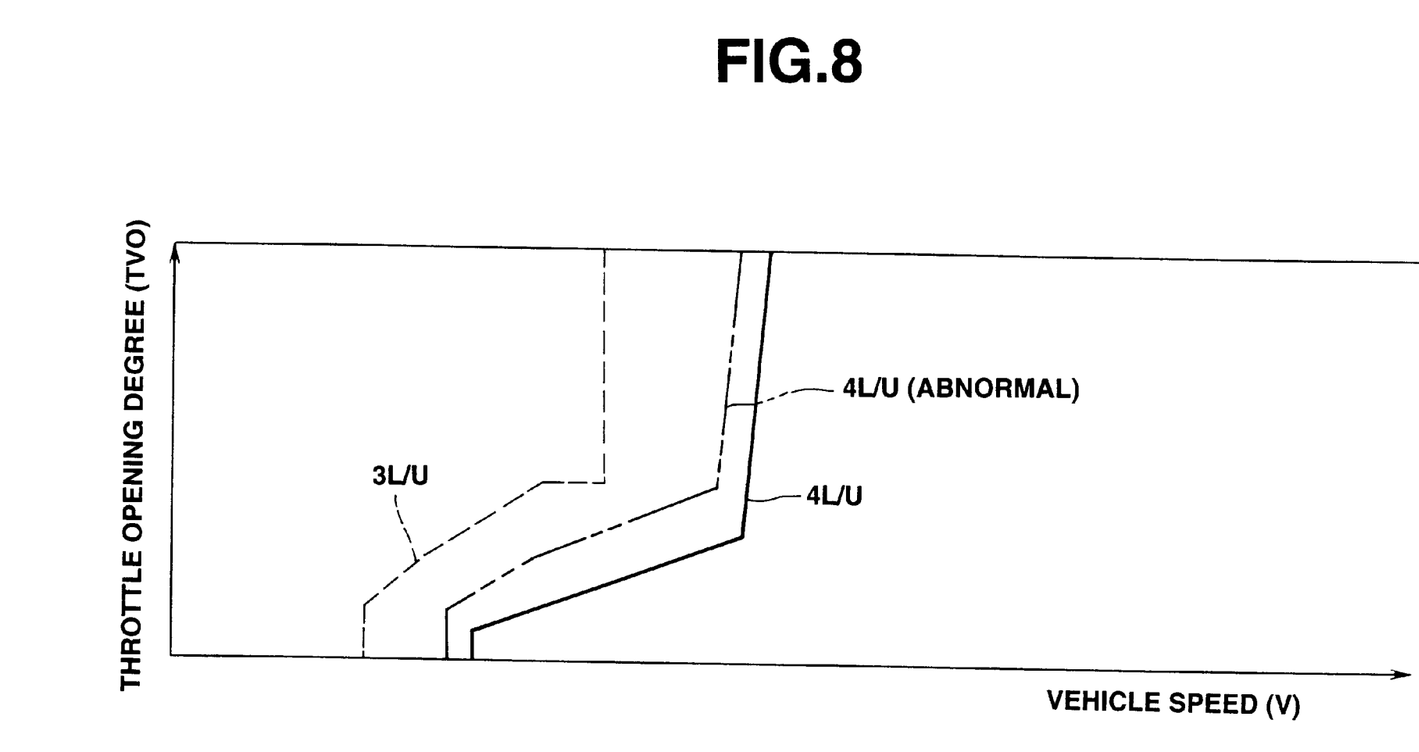
FIG. 8 is a lock-up pattern map of the torque converter, with an addition of an abnormal fourth gear lock-up pattern.

In the lock-up control of the torque converter 3, based on the throttle valve opening degree "TVO" and the vehicle speed "V" derived from the rotation speed "No" of the transmission output shaft, the control unit 9 makes a judgment as to whether the torque converter 3 should take the lock-up ON condition or lock-up OFF condition, with reference to the lock-up pattern map of FIG. 8.

In the pattern map of FIG. 8, the solid line represents a normal fourth gear lock-up pattern and the broken line represents a normal third gear lock-up pattern, which are to be used when the torque converter 3 is not overheated.

While, in the lock-up pattern map of FIG. 8, the two dot line represents an abnormal fourth gear lock-up pattern which is to be used when the torque converter 3 is overheated.

It is to be noted that in the map of FIG. 8, in addition to the above-mentioned abnormal fourth gear lock-up pattern, an abnormal third gear lock-up pattern is to be provided for the third gear lock-up pattern. However, for clarification of the map of FIG. 8, illustration of such abnormal third gear lock-up pattern is omitted from the drawing.

In these cases, as is understood from the abnormal fourth gear lock-up pattern, any abnormal lock-up pattern is positioned at a lower vehicle speed side than the corresponding normal lock-up pattern.

It is to be noted that when selecting the abnormal lock-up pattern, the torque converter 3 can easily assume the lock-up ON condition as compared with a case of selecting the normal lock-up pattern.

Like in case of determining the suitable gear of the above-mentioned transmission 2, based on the judgements, the control unit 9 carries out the lock-up ON/OFF control of the torque converter 3. That is, when overheat of the torque converter 3 is not detected, the control unit 9 carries out the lock-up ON/OFF control of the torque converter 3 with reference to the normal lock-up patterns of FIG. 8. While, when overheat of the torque converter 3 is detected, the control unit 9 carries out the lock-up ON/OFF control of the torque converter 3 with reference to the abnormal lock-up patterns which are exemplarily represented by the abnormal fourth gear lock-up pattern of FIG. 8.

If, under this control, the intersection point between the existing vehicle speed "V" and the existing throttle valve opening degree "TVO" indicates a lock-up ON zone which is positioned at a higher vehicle speed side than the lock-up pattern of a corresponding gear, the control unit 9 determines 95% for the drive duty ratio "D" to establish the lock-up ON condition of the torque converter 3. While, if the intersection point between the existing vehicle speed "V" and the existing throttle valve opening degree "TVO" indicates a lock-up OFF zone which is positioned at a lower vehicle speed side than the lock-up pattern of the corresponding gear, the control unit 9 determines 5% for the drive duty ratio to establish the lock-up OFF condition of the torque converter 3.

In the following, programmed steps for setting the overheat judging reference temperature used for judging overheat of the torque converter 3 will be described in detail with reference to the flowchart of FIG. 2.

At step S-21, the oil pan fluid temperature "To/p" detected by the sensor 14 is read. Then, at step S-22, a judgement is carried out as to whether the engine 1 is under a high load operation condition or not. As is known, the high load operation condition of the engine 1 tends to induce overheat of the torque converter 3.

Figure 3:
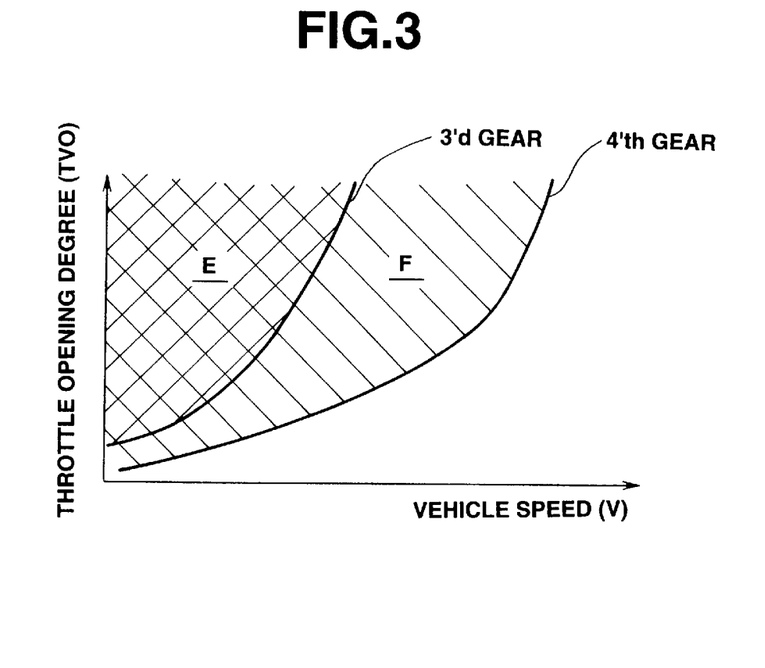
FIG. 3 is a data map showing engine high load operation zones in third and fourth gears of the transmission, which tend to induce overheat of the torque converter.

For carrying out the judgement of step S-22, such a data map as shown in FIG. 3 is used, which shows critical characteristic curves for respective gears of the transmission 2 in the relation between the throttle opening degree "TVO" and the vehicle speed "V". In the data map of FIG. 3, only the critical curves for third and fourth gears are illustrated. It is to be noted that zones indicated by "E" and "F" are engine high load operation zones which tend to induce overheat of the torque converter 3 when the transmission assumes third and fourth gears respectively. That is, for carrying out the judgement of step S-22, the existing gear of the transmission 2 is derived from the rotation ratio "Nt/No" between the input and output shafts of the transmission 2, and if the intersection point between the vehicle speed "V" and the existing throttle opening degree "TVO" indicates the zone "E" in case of third gear (or zone "F" in case of fourth gear), the control unit 9 judges that the engine 1 is under the high load operation. Although not illustrated in the map of FIG. 3, judgement in case of first and second gears is carried out in substantially same way.

Figure 2:
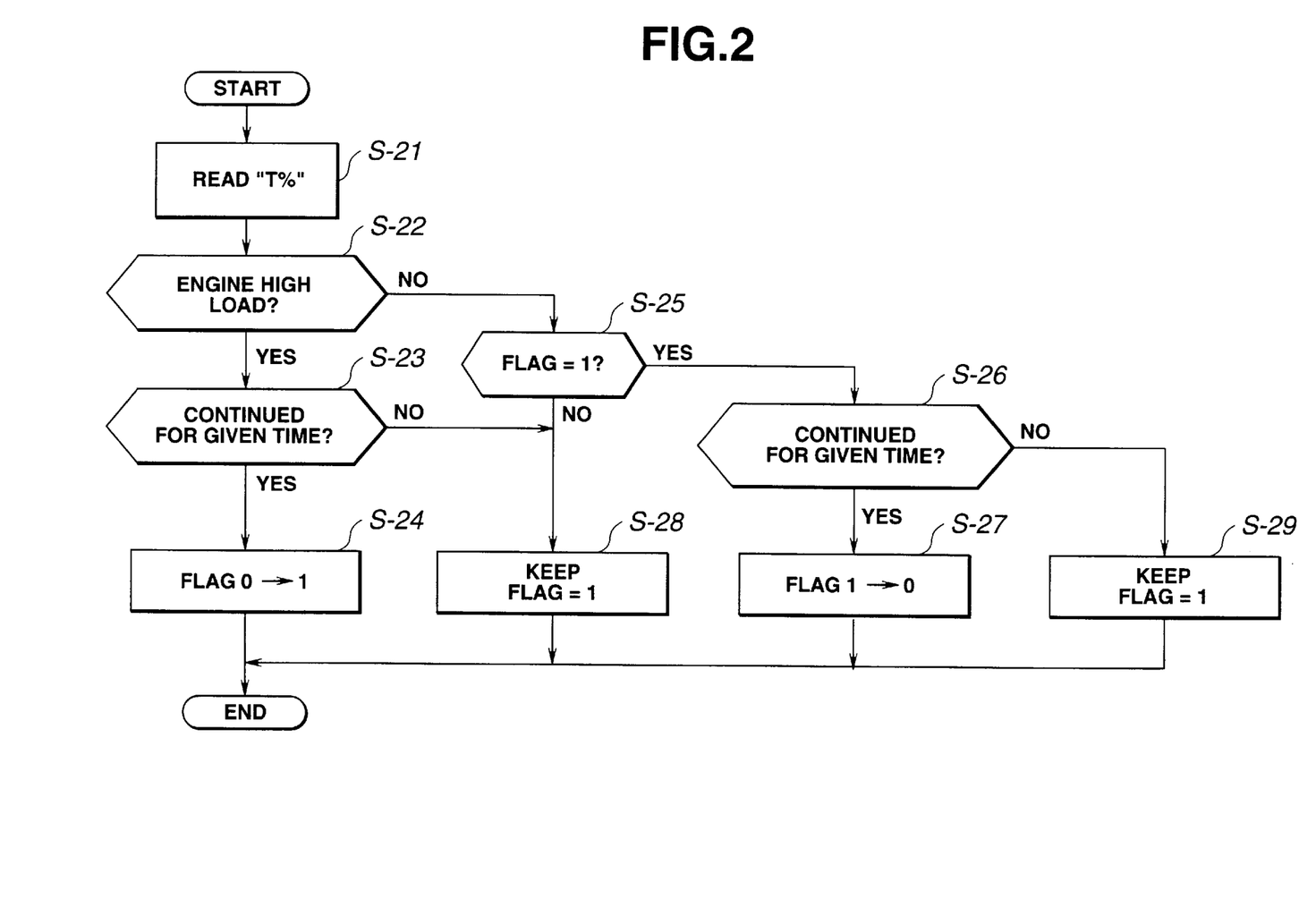
FIG. 2 is a flowchart showing operation steps executed by a control unit for determining an overheat judging reference temperature of each engine load condition.

Referring back to the flowchart of FIG. 2, if YES at step S-22, that is, when the engine 1 is under the high load operation condition, the operation flow goes to step S-23. At this step, judgement is carried out as to whether the high load operation of the engine 1 has continued for a given time or not. If YES, that is, when the high load operation of the engine 1 has continued for the given time, the operation flow goes to step S-24. At this step, a flag "FLAG" for switching the overheat occurrence and settlement determining reference temperatures is turned from 0 (zero) to 1 (one).

Figure 4:
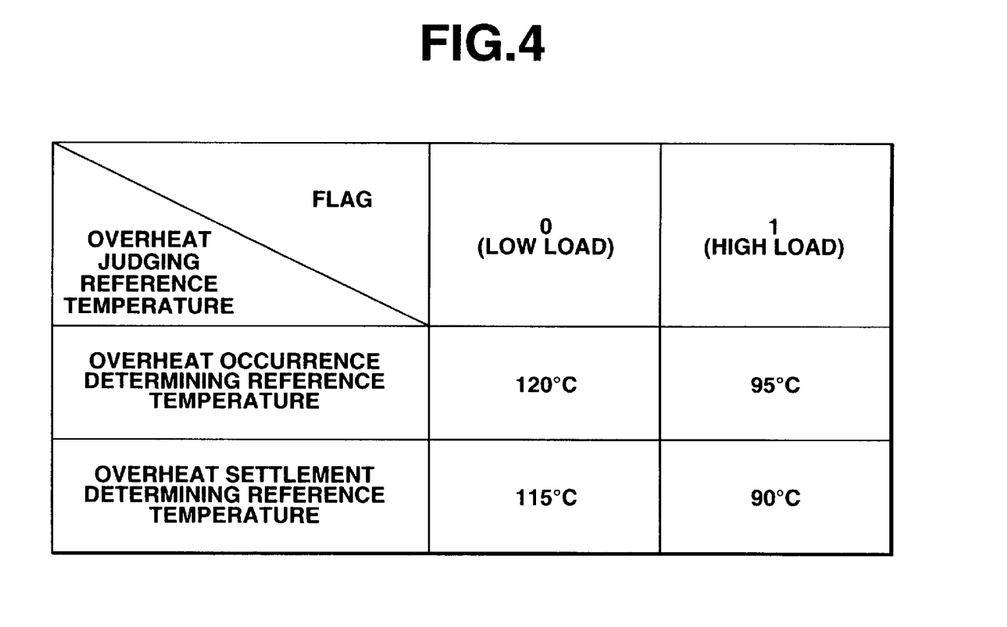
FIG. 4 is a table showing the overheat judging reference temperatures of engine high and low load operation conditions, which are used for judging overheat of the torque converter.

Due to this turning of the flag "FLAG" from 0 (zero) to 1 (one), as is exemplarily shown by the table of FIG. 4, the overheat occurrence determining reference temperature is changed or lowered from 120° C. for the engine low load operation condition to 95° C. for the engine high load operation condition, and at the same time, the overheat settlement determining reference temperature is changed or lowered from 115° C. for the engine low load operation condition to 90° C. for the engine high load operation condition. These overheat occurrence and settlement determining reference temperatures 95° C. and 90° C. thus newly set are used for judging the overheat of the torque converter 3 before carrying out the above-mentioned transmission gear control and torque converter lock-up ON/OFF control.

Due to presence of the same temperature difference 5° C. (viz., hysteresis) between 120° C. and 115° C. which are the overheat occurrence and settlement determining reference temperatures for the engine low load operation condition and between 95° C. and 90° C. which are the overheat occurrence and settlement determining reference temperatures for the engine high load operation condition, the overheat judging is carried out without suffering from undesired hunting.

Figure 5:
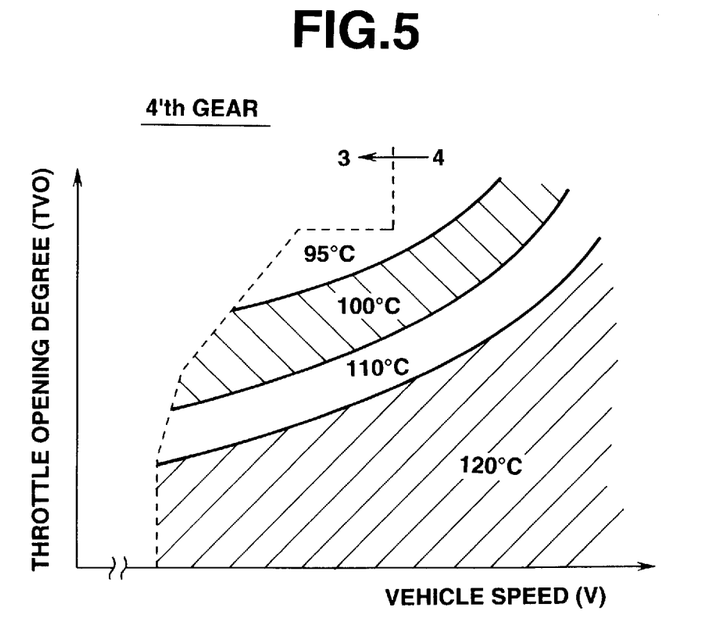
FIG. 5 is a data map showing the temperature of the fluid in an oil pan of the transmission under selecting fourth gear at the time when overheat of the torque converter is induced.
Figure 6:
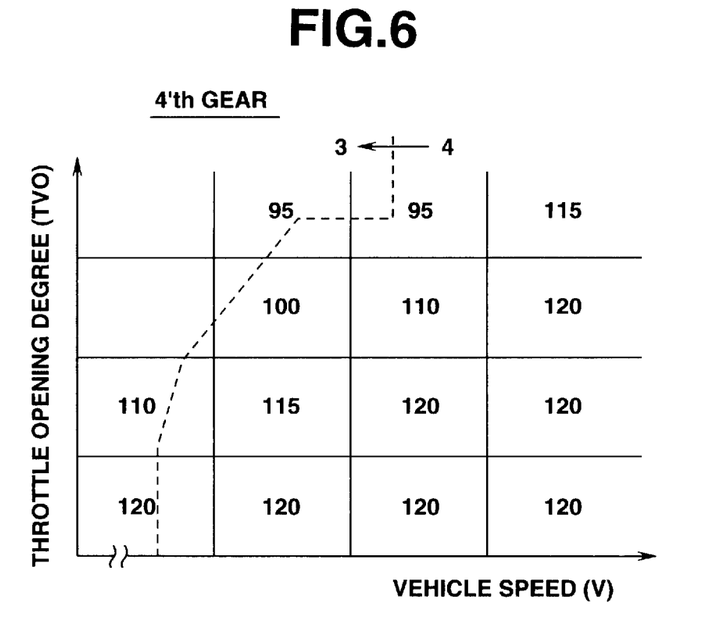
FIG. 6 is a data map provided based on the data map of FIG. 5, showing zones of the oil pan fluid temperature with respect to a vehicle speed and a throttle open degree.

The table of FIG. 4 is provided with reference to date maps such as those of FIGS. 5 and 6. The data map of FIG. 5 shows the relation between the oil pan fluid temperature "To/p", the vehicle speed "V" and the throttle opening degree "TVO", at the time when overheat of the torque converter 3 is induced under fourth gear of the transmission 2. The data map of FIG. 6 is provided based on the map of FIG. 5, showing zones of the oil pan fluid temperature "To/p", which induce overheat of torque converter 3 under fourth gear of the transmission 2.

If NO at step S-22, that is, when the engine 1 is under the low load operation, the operation flow goes to step S-25. At this step, judgement is carried out as to whether the flag "FLAG" is 1 (one) or not. If YES, that is, when the flag "FLAG" is 1 (one), the operation flow goes to step S-26. At this step, judgement is carried out as to whether the low load operation of the engine 1 has continued for a given time or not. If YES, that is, when the low load operation of the engine 1 has continued for the given time, the operation flow goes to step S-27. At this step, the flag "FLAG" is turned from 1 (one) to 0 (zero), that is, reset to 0 (zero).

Due to this turning of the flag "FLAG" from 1 (one) to 0 (zero), as is exemplarily shown by FIG. 4, the overheat occurrence determining reference temperature is changed or increased from 95° C. for the engine high load operation condition to 120° C. for the engine low load operation condition, and at the same time, the overheat settlement determining reference temperature is changed or increased from 90° C. for the engine high load operation condition to 115° C. for the engine low load operation condition. These overheat occurrence and settlement determining reference temperatures 120° C. and 115° C. thus newly set are used for judging overheat of the torque converter 3 before carrying out the above-mentioned transmission gear control and torque converter lock-up ON/OFF control.

If NO at step S-23, that is, when the high load operation of the engine 1 has not continued for the given time, or if NO at step S-25, that is, when the flag "FLAG" is not 1 (one), the operation flow goes to step S-28 to keep the flag "FLAG" 0 (zero). Furthermore, if NO at step S-26, that is, when the low load operation of the engine 1 has not continued for the given time, the operation flow goes to step S-29 to keep the flag "FLAG" 1 (one). In cases of the steps S-28 and S-29, changing of the overheat occurrence determining reference temperature and that of the overheat settlement determining reference temperature are not made. That is, in case of the step S-28 or S-29, the existing overheat occurrence and settlement determining reference temperatures 120° C. and 115° C. (or, 95° C. and 90° C.) are used for judging overheat of the torque converter 3.

In the control unit 9, the oil pan fluid temperature "To/p" detected by the sensor 14 is compared with the above-mentioned overheat judging reference temperature. That is, when the oil pan fluid temperature "To/p" is detected higher than the overheat occurrence determining reference temperature, the control unit 9 judges that the torque converter 3 is overheated, and when the oil pan fluid temperature "To/p" is detected lower than the overheat settlement determining reference temperature, the control unit 9 judges that the torque converter 3 is not overheated.

When overheat of the torque converter 3 is detected, the control unit 9 carries out the gear selection control of the transmission 2 with reference to the abnormal up-shift and down-shift patterns of FIG. 7 which are exemplarily represented by the abnormal "3→4" up-shift pattern, and at the same time, the control unit 9 carries out the lock-up ON/OFF control of the torque converter 3 with reference to the abnormal lock-up patterns of FIG. 8 which are exemplarily represented by the abnormal fourth gear lock-up pattern of FIG. 8.

It is to be noted that the above-mentioned control prevents the torque converter 3 from being overheated. That is, at the time when cooling of the torque converter 3 is actually needed, a lower gear is readily selected by the transmission 2 and the lock-up ON condition is readily selected by the torque converter 3. In the lock-up ON condition, heat generation of the fluid in the torque converter 3 is quite small because slippage of the converter 3 does not occur.

In the following, advantages given by the present invention will be described.

First, overheat of the torque converter 3 can be detected without usage of a separate temperature sensor which directly detects the temperature of the fluid in the torque converter 3. This reduces the cost of the overheat prevention system. In the present invention, detection of overheat of the torque converter 3 is achieved by comparing the existing oil pan fluid temperature "To/p" with the overheat occurrence and settlement determining reference temperatures which are provided from data maps. Furthermore, in the invention, detection of overheat of the torque converter 3 is precisely made because the system does not employ an arithmetic operation for detecting or estimating the temperature of fluid in the torque converter 3.

As is shown by FIG. 4, the overheat judging reference temperature (viz., the overheat occurrence and settlement determining reference temperatures) takes a lower level (viz., 95° C. and 90° C.) when the engine 1 is under the high load condition. Accordingly, when a temperature lowering of the torque converter 3 is really needed such as the case wherein the engine 1 is under the high load condition, the overheat suppressing operation is assuredly carried out, while, when the temperature lowering of the torque converter 3 is not needed such as in the case wherein the engine is in the low load condition, the overheat suppressing operation is not carried out.

As is exemplarily shown by FIG. 3, in the present invention, the engine high load operation zone "E" or "F" and the engine low load operation zone are provided for each gear of the transmission 2, and when the engine high load operation is continued for a given time, the flag "FLAG" is turned from 0 (zero) to 1 (one) for changing the overheat judging reference temperature from relatively high value (viz., 120° C., 115° C.) for the engine low load operation to relatively low value (viz., 95° C., 90° C.) for the engine high load operation, and when the engine low load operation is continued for a given time, the flag "FLAG" is turned from 1 (one) to 0 (zero) for changing the overheat judging reference temperature from relatively low value (viz., 95° C., 90° C.) for the engine high load operation to relatively high value (viz., 120° C., 115° C.) for the engine low load operation.

That is, only two types of overheat judging reference temperatures are needed for each transmission gear, and thus saving of memory of the control unit 9 is achieved. Due to presence of the difference (viz., 5° C.) between the overheat occurrence determining reference temperature (viz., 120° C., 95° C.) and the overheat settlement determining reference temperature (viz., 115° C., 90° C.), the switching between these two reference temperatures is carried out smoothly without suffering from a hunting.

As is easily understood to those skilled in the art, if the types of the overheat judging reference temperatures are determined three or more, much accurate overheat judging is obtained for the torque converter. In this case, more detailed data maps than those of FIGS. 5 and 6 are needed.

The entire contents of Japanese Patent Application P10-285151 (filed Oct. 7, 1998) are incorporated herein by reference.

Although the invention has been described above with reference to a certain embodiment of the invention, the invention is not limited to the embodiment described above. Various modifications and variations of the embodiment described above will occur to those skilled in the art, in light of the above teachings.

What is claimed is:

1. In a torque converter automatic transmission of a motor vehicle powered by an engine, an overheat prevention system of the torque converter, comprising:
a first unit which detects the temperature of a hydraulic fluid in an oil pan of the transmission;
a second unit which derives an existing operation load of the engine;
a third unit which derives an overheat judging reference temperature that lowers as the operation load of the engine increases; and
a fourth unit which carries out an operation to suppress overheat of said torque converter when the temperature of the oil pan fluid temperature exceeds said overheat judging reference temperature.

2. An overheat prevention system as claimed in claim 1, in which said second unit provides engine high and low load operation zones for each transmission gear, and when operation of the engine under the high load operation zone is continued for a given time, said third unit lowers said overheat judging reference temperature to meet the high load operation of the engine.

3. An overheat prevention system as claimed in claim 2, in which when operation of the engine under the low load operation zone is continued for a given time, said third unit raises said overheat judging reference temperature to meet the low load operation of the engine.

4. An overheat prevention system as claimed in claim 1, in which said overheat judging reference temperature is derived from a data base which represents the temperature of the oil pan fluid temperature with respect to the transmission gear, the engine load and a vehicle speed.

5. In a torque converter automatic transmission of a motor vehicle powered by an engine,
an overheat prevention system of the torque converter, comprising:
first means for detecting the temperature of a hydraulic fluid in an oil pan of the transmission;
second means for deriving an existing operation load of the engine;
third means for deriving an overheat judging reference temperature that lowers as the operation load of the engine increases; and
fourth means for carrying out an operation to suppress overheat of said torque converter when the temperature of the oil pan fluid temperature exceeds said overheat judging reference temperature.

6. In a torque converter automatic transmission of a motor vehicle powered by an engine,
an overheat prevention system of the torque converter, comprising:
a first unit which detects the temperature of a hydraulic fluid in an oil pan of the transmission;
a second unit which detects whether the engine is under high load condition or low load condition;
a third unit which derives an overheat judging reference temperature in accordance with the detection of said second unit, said overheat judging reference temperature indicating a first reference temperature upon detection of the high load condition of the engine by said second unit and indicating a second reference temperature upon detection of the low load condition of the engine by said second unit, said first reference temperature being lower than said second reference temperature; and
a fourth unit which carries out at least one given operation to lower the temperature of the torque converter when the temperature of the hydraulic fluid in the oil pan exceeds said overheat judging reference temperature.

7. An overheat prevention system as claimed in claim 6, in which said at least one given operation comprises shifting of a lock-up pattern of the torque converter to a lower vehicle speed side.

8. An overheat prevention system as claimed in claim 7, in which said at least one given operation further comprises shifting of a shift pattern of the transmission to a higher vehicle speed side.

9. An overheat prevention system as claimed in claim 6, in which said second unit detects the load condition of the engine based on a data map which represents a relationship between a throttle opening degree and a vehicle speed for each gear of the transmission.

10. An overheat prevention system as claimed in claim 9, in which said data map is provided with engine high load and low load operation zones each being represented by the combination of the throttle opening degree, the vehicle speed and the gear of the transmission.

11. An overheat prevention system as claimed in claim 10, in which said second unit determines that the engine is under high load condition when the engine operates in the high load operation zone for a given time, and determines that the engine is under low load condition when the engine operates in the low load operation zone for a given time.

12. An overheat prevention system as claimed in claim 6, in which each of said first and second reference temperatures has a range whose upper and lower values are an overheat occurrence determining reference temperature and an overheat settlement determining reference temperature, so that when the oil pan fluid temperature is detected higher than the overheat occurrence determining reference temperature, occurrence of overheat of the torque converter is judged, and when the oil pan fluid temperature is detected lower than the overheat settlement determining reference temperature, settlement of overheat of the torque converter is judged.

13. An overheat prevention system as claimed in claim 12, in which the range of each of the first and second reference temperatures is 5° C.

14. In a torque converter automatic transmission of a motor vehicle powered by an engine,
a method of suppressing overheat of the torque converter, comprising:
detecting the temperature of a hydraulic fluid in an oil pan of the transmission;
detecting whether the engine is under high or low load condition;
deriving an overheat judging reference temperature in accordance with the detection as to whether the engine is under high or low load condition, said overheat judging reference temperature indicating a first reference temperature upon detection of the high load condition and indicating a second reference temperature upon detection of the low load condition, said first reference temperature being lower than said second reference temperature; and
carrying out a given operation to lower the temperature of the torque converter when the temperature of the hydraulic fluid in the oil pan exceeds said overheat judging reference temperature.

15. A method as claimed in claim 14, in which said given operation is to shift a lock-up pattern of the torque converter to a lower vehicle speed side.

16. A method as claimed in claim 14, in which said given operation is to shift a shift pattern of the transmission to a higher vehicle speed side.

* * * * *